July 28, 1964  M. P. HOGUE  3,142,448
COMBINED STOPPER AND CONTROL MEANS FOR WASTE DISPOSAL APPARATUS
Filed Jan. 30, 1961  2 Sheets-Sheet 1

INVENTOR.
MARCUS P. HOGUE
BY
HIS ATTORNEY

July 28, 1964 M. P. HOGUE 3,142,448
COMBINED STOPPER AND CONTROL MEANS FOR WASTE DISPOSAL APPARATUS
Filed Jan. 30, 1961 2 Sheets-Sheet 2
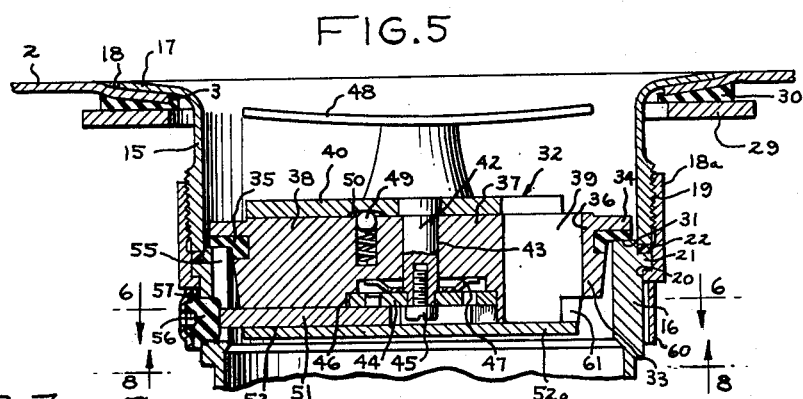
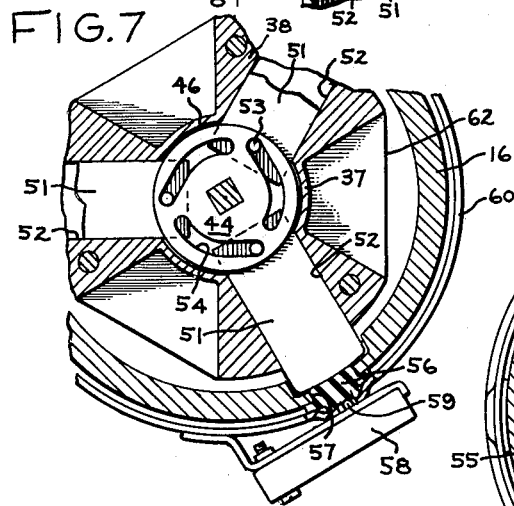
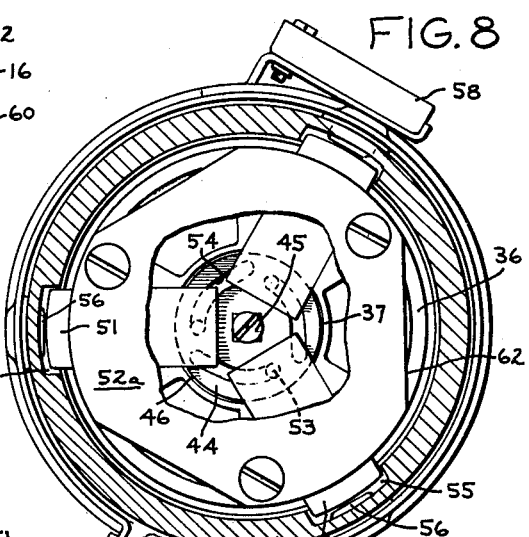
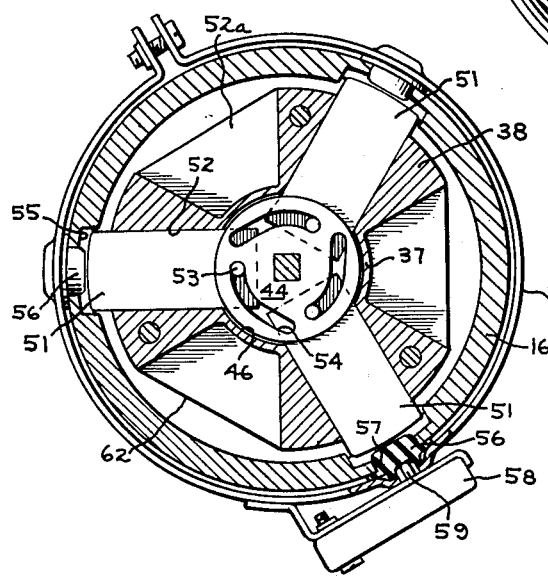
INVENTOR.
MARCUS P. HOGUE
BY
HIS ATTORNEY

United States Patent Office 3,142,448
Patented July 28, 1964

3,142,448
COMBINED STOPPER AND CONTROL MEANS FOR WASTE DISPOSAL APPARATUS
Marcus P. Hogue, Louisville, Ky., assignor to General Electric Company, a corporation of New York
Filed Jan. 30, 1961, Ser. No. 85,660
11 Claims. (Cl. 241—32.5)

This invention relates to apparatus for the disposal of waste material wherein garbage and other kitchen wastes are comminuted in the presence of water by power driven comminuting means to a flowable mixture and the resultant mixture flushed to the waste disposal system of the home, and is especially applicable to such disposal apparatus which is connected with the drain opening or line of a kitchen sink and like structure, which opening serves as an ingress opening for the admission of the waste material to the disposal apparatus and also for the admission of water during the comminuting operation.

This invention contemplates the provision in apparatus of this kind of a combined closure means functioning as a stopper for the sink drain opening and also as control means for controlling the operation of the power operated comminuting means; the stopper also functioning both as a safety device to prevent the insertion of the hand into the apparatus while operating, and as a baffle to prevent materials from being thrown out of the apparatus at that time, and also to provide for the admission of water to the apparatus while operating.

Such combined stopper and control means considered broadly have been provided heretofore. Certain of these means have included locking means for locking the closure means against removal from the sink opening when the power means is functioning to drive the comminuting means. This control in general is quite satisfactory but it is subject to the objection that if a bone or like hard object jams between the comminuting means and the stopper the comminuting means is jammed in the stop condition, all the while the control is calling for power to drive it. This may result in damage to the comminuting means or to the comminuting driving means—commonly an electric motor—or to both. Moreover, the jam may be so tight that it is not possible to release the stopper and control element from the sink opening so that it is not possible to shut-off the power by its normal control.

Another combined stopper and control device has been disclosed which may allow the release of the stopper element in response to a jam, but it inherently has such a structure that it is continually subject to what I will call nuisance stops; that is, it is shiftable on its seat from its comminuting operation controlling position and thus may periodically stop the machine in response to the buffeting or contacts made on it by waste particles being thrown against its undersurface; and the stopper is not resettable automatically to its start position, thereby requiring a re-start operation on the part of the attendant each time the machine is stopped.

Moreover, the combined stopper and control elements heretofore known had to be carefully placed in the drain opening in a single predetermined controlling position which, of course, required care on the part of the attendant.

This invention contemplates the provision of a combined stopper and power comminuting means control which will perform its safety and control functions and the function of providing for the flow of water to the machine, all when placed in an easily found operating position; which will be automatically ejected upwardly from the opening in response to the application to it of a predetermined force below so as to stop the machine and uncover the opening automatically should a bone or like object tend to jam between it and the comminuting means; moreover, it is an object of this invention to provide in this control, means controllable at will for closing the sink drain, opening it to provide for normal sink drainage and also to open it while the machine is comminuting waste material so that water may be supplied to the machine from the sink; and further, means are provided for causing the water flow under the operating conditions in such a manner as to noise insulate the operating machine.

In accordance with this invention, there is provided a stopper and control element seatable on a seat provided in the drain opening to liquid seal the seat. The stopper is rigidly locked against rotary motion with respect to the seat by suitable locking means rendered effective when the stopper is inserted in the opening and placed on the seat. However, the parts are arranged so that the stopper structure is freely movable upwardly away from the seat and out of the drain opening in response to a predetermined force applied to its lower side, as the force of a bone or like element tending to jam against it. A control element is provided on the stopper movable at will with respect to the stopper to operate an actuating element for the control of the power operated comminuting means to effect the operation of the means to grind up the waste material.

The stopper is also provided with a passage through it so that water may be flowed from the sink into the machine to assist in the grinding operation and to flush out the mixture of water and comminuted material to the house drain. This passage is controlled by a suitable closure plate preferably connected with the control actuating element for the power means so that when the machine is operating the passage will be opened to provide for the water flow.

Also in the preferred form of the invention the actuating element will be arranged to function to rigidly lock the stopper against rotation by coaction with a fixed part in the drain opening. In one embodiment of this invention the control element may be in the form of a radially movable arm which will ride in a suitable recess formed under the drain opening. The power means control actuating element is positioned opposite the recess in position to be operated by a radial outward movement of the control arm.

Coacting with the control arm are means yieldingly holding the stopper assembly in position against vertical movement, but yielding to provide for the ejection of the stopper assembly in response to a tendency of waste material to jam against the stopper.

Other objects, as well as the details of that which I believe to be novel and my invention, will become apparent from the following description and the claims appended thereto, taken in connection with the accompanying drawings wherein:

FIG. 5 is a vertical sectional sectional view taken through the line 5—5 of FIG. 4 and looking in the direction of the arrows;

FIG. 6 is a horizontal sectional view taken through the line 6—6 of FIG. 5 and looking in the direction of the arrows;

FIG. 7 is a sectional view similar to FIG. 6 but illustrating certain elements in different operative positions than they occupy in FIG. 6; and FIG. 8 is a bottom plan sectional view taken through the line 8—8 of FIG. 5 and looking in the direction of the arrows and also having parts broken away so as to illustrate certain details of construction.

Figure 2:
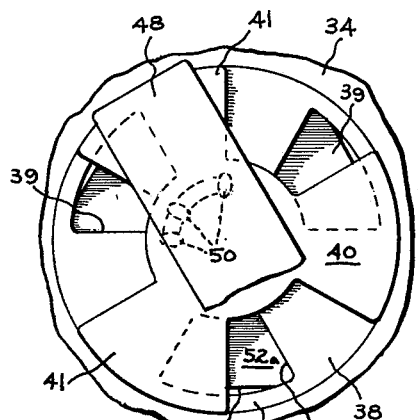
FIG. 2 is a top plan view on an enlarged scale of the stopper shown in FIG. 1 showing the stopper in the partially open position.

Referring to the drawings, this invention has been shown in one form as applied to waste disposal apparatus 1 intended to be used in connection with a kitchen sink, or similar device, which is provided with a sink basin having a bottom wall 2 in which there is a circular sink drain opening 3.

The disposal apparatus 1 has a generally cylindrical tubular housing 4 enclosing a grinding or comminuting chamber 5 at the bottom of which the comminuting or shredding of the waste material takes place. Any suitable shredding means may be used, for example, the shredding means may be used which is described and claimed in the United States patent to H. J. Macemon No. 2,828,083, dated March 25, 1958, and assigned to the General Electric Company, the assignee of the present invention. Briefly, this shredding means comprises a stationary shredding ring 6 which is provided with cutting surfaces 7 and with a plurality of apertures 8. Coacting with the shredding ring 6 is a material impelling flywheel 9 which is provided with impellers 10 arranged when the flywheel is rotated to impel the waste material on the flywheel against the shredding ring to comminute the material into a fine mass. It will be understood that during this operation water from the sink will be caused to flow down through the housing 5, and that eventually the water and the comminuted material constituting a flowable mass will be impelled outwardly through the apertures 8 into a drain chamber 11 which drains into a drain line 12 which in turn will be connected with the sewer line of the house. The flywheel 9 is driven by means of a suitable electric motor 13.

Figure 1:
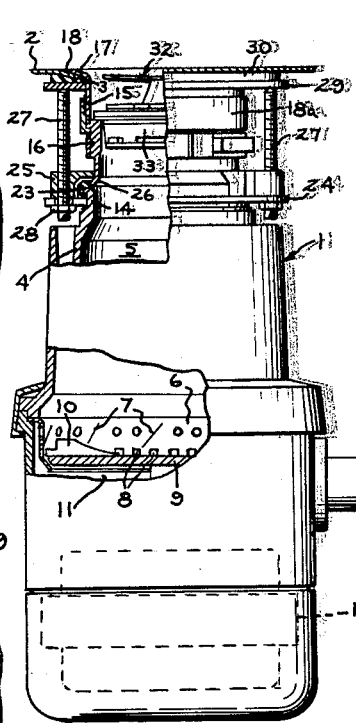
FIG. 1 is an elevation of waste disposal apparatus embodying this invention, parts being shown in section so as to illustrate certain details of construction.

The upper end 14 of the housing 5 constitutes the opening through which the waste material and the water is supplied to the housing from the sink drain opening 3. The upper end 14 (FIG. 1) of housing 5 is connected with the sink drain opening 3 by means of a cylindrical tubular sleeve 15 and a cylindrical tubular sleeve or housing 16. The sleeve 15 is inserted down through the sink opening 3 and at its upper end is provided with an outwardly extending circular flange 17 adapted to overlie the depressed annular marginal edge 18 of the drain opening 3, as shown in FIGS. 1 and 5. The sleeve 15 constitutes the supporting means for the housing 4 and associated comminuting means and its power operating means—the motor 13. For this purpose, it functions through the cylinder 16. As shown, the upper end of cylinder 16 is telescoped slightly into the lower end of sleeve 15, and is secured to the sleeve by a ring 18a (shown more clearly in FIG. 5) having a threaded connection 19 with the lower outer surface portion of sleeve 15; the ring 18a has at its lower end an inturned flange 20 which engages an external flange 21 on cylinder 16 to support the cylinder. A ring gasket 22 is interposed between flange 21 and the lower end of sleeve 15. As shown in FIG. 1, the upper end of the housing 4 abuts the lower end of cylinder 16 through a ring gasket 23, and housing 4 is locked or supported in this position by a support ring 24 encircling the upper end of the housing and engaging the gasket 23 and an out-turned flange on the upper end of housing 4 in supporting relation, as shown. A clamping ring 25 encircles the cylinder 16 and bears against the upper side of an outwardly flaring flange 26 on the lower end of the cylinder; the ring 24 is secured to this clamping ring by bolts 27, nuts 28 being threaded on the bolts under ring 24 to effect the clamping action. The entire aforedescribed parts are clamped to the sink 2 through the bolts 27 which at their upper ends bear against a clamping ring plate 29 pressing against the sink; preferably a ring gasket 30 will be inserted between the ring plate 29 and the sink.

The cylinder 16 thus constitutes, in effect, a continuation of the comminuting housing 4, and so, its upper end may be considered as the upper ingress opening of the housing. This cylinder is a part of my combined stopper and control assembly arranged in accordance with this invention. This assembly includes a sealing seat 31 formed on the top of the cylinder 16 and in effect therefore located within the drain line of the sink. Coacting with this seat is a stopper assembly generally indicated by the numeral 32.

The stopper assembly 32 comprises a flat generally cylindrical body 33 formed at its upper end with an outwardly extending circular flange 34 which rests upon and supports the stopper assembly from the seal seat 31, preferably through a ring gasket 35 mounted on the stopper. The body 33 preferably will taper inwardly and downwardly with respect to the cylinder 16, as shown, so that it is loosely mounted thereon, the flange 34 constituting the supporting means for the stopper.

The body 33 is formed by an outer ring 36 which is joined to a central barrel-like portion 37 through a plurality (three in the embodiment shown) of spokes 38, the parts 36, 37 and 38 all preferably being formed integrally together. The spokes define three vertical passages 39 between them and extending from the top to the bottom of the stopper.

Figure 3:
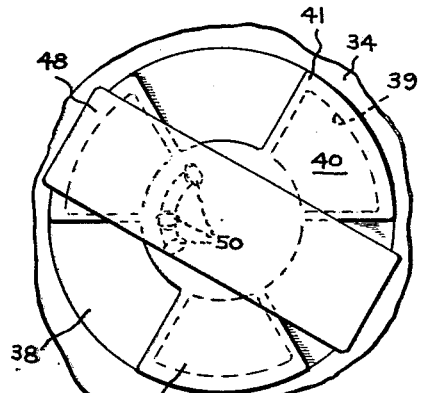
FIG. 3 is a view similar to FIG. 2 but showing the stopper in the fully closed position.
Figure 4:
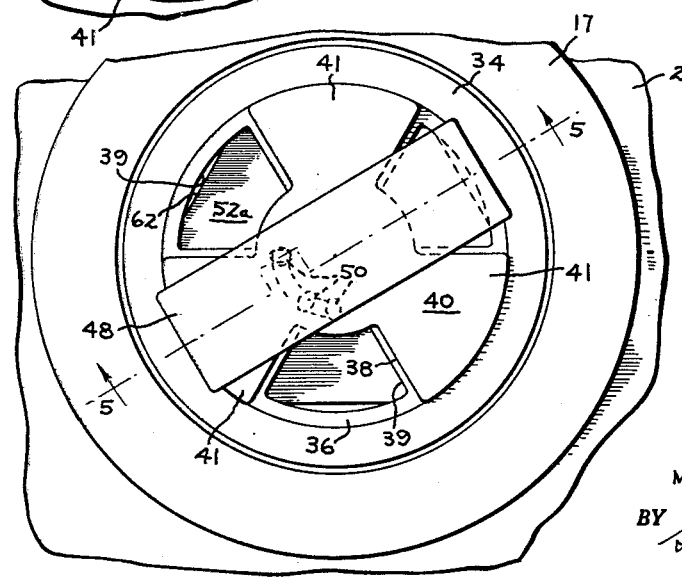
FIG. 4 is a view similar to FIGS. 2 and 3, but showing the stopper in the fully open position.

Passages 39 are controlled by a closure plate 40 on top of the stopper and having three controlling portions 41 for the respective upper entrance openings of the passages 39. This plate 40 is secured to a control shaft 42 arranged in the central vertical axis of the barrel portion 37 and passing through a bore 43 provided for it in this portion from top to bottom, as shown in FIG. 5. At its lower end the shaft 42 is secured to the body 33 by a circular cam plate 44 (having additional functions to be described) secured or keyed to the lower end of shaft 42 to rotate with it and locked to the shaft by screw fastening means 45. Preferably the cam 44 will be received in a circular recess 46 formed in the body 33, and preferably shaft 42 and cam plate will be held in place by a spring washer 47 interposed between the cam and the body. Secured to the upper end of the shaft 42 and hence to the plate 40 is a control and operating knob 48. This knob is rotatable to move the valve plate 40 to cause its arms 41 to assume positions from the limit of counterclockwise movement of the plate (as viewed in FIG. 4) to open the passages 39 so that the sink may drain. Clockwise movement of the knob causes the arms 41 to close the passages 39 and seal the sink as shown in FIG. 3. Further movement in a clockwise direction serves to partially open these passages as shown in FIG. 2. A spring pressed ball 49 engageable in three recesses 50 may be used to index or establish or "feel" these positions of the knob 48.

The knob 48 also controls means to yieldingly hold the stopper assembly 32 in its operating position shown in FIGS. 1 and 5, and further to lock it against rotary motion therein. For these purposes the knob controls the positions of three radial control arms 51. The arms 51 are positioned 120° apart and are received in recesses 52 extending radially outwardly from the central circular recess 46 below the cam 44; these recesses are closed by a bottom plate 52a. At their inner ends the arms 51 are provided with pins 53 received in cam slots 54 provided for them in the cam plate, as shown. These cam slots control the radial positions of the arms 51 in this way: when the control knob 48 is operated to move the valve plate 40 between the fully closed and fully open positions of FIGS. 3 and 4 respectively, the radial arms will not be moved at all from their inner fully retracted positions shown in FIGS. 6 and 8, but when the knob 48 is moved clockwise from valve closed position of FIG. 3 to the partially open position of FIG. 2 the arms 51 will be fully extended to their positions shown in FIG. 7. However, the arms 51 when fully retracted will still protrude from their slots 52 as shown in FIGS. 1 and 8. These protruding ends serve to interlock the stopper assembly 32 with the housing 16 to prevent relative rotary motion between them. For this purpose they are receivable in three vertical recesses or slots 55 provided for them in the inner surface of the housing 16. Thus to insert the stopper the protruding ends of the arms are aligned with the recesses and the stopper dropped into place on the seat 31.

The arms 51 are also utilized yieldingly to hold the stopper assembly against vertical displacement from seat 31. For this purpose, three yielding holding buttons 56, formed of a suitable resilient, yielding material such as rubber, are provided in the recesses 55. Preferably the buttons 56 will be formed as shallow cup-shaped members—circular in cross-section—as shown in FIGS. 5, 6 and 7, with their bottom body portions inserted from the outside of ring 16 into the recesses 55 through circular openings 57. The buttons are positioned in the recesses 55 so that they will be engaged by the ends of arms 51 when the arms are fully extended, as shown in FIG. 7. When the arms are thus extended they apply a force to the buttons 56 which therefore hold the stopper in place against vertical displacement during normal comminuting operations. But should a bone or other hard object tend to jam between the flywheel 9 and the stopper, the buttons will yield and allow the jam to eject the stopper from the seat 31.

This ejection in response to a jam is utilized to arrest the grinding operation. For this purpose and moreover for controlling the grinding operating motor 13 to start and stop in normal functions, the arms 51 are arranged to control the motor by way of one of the buttons 56. The motor is controlled directly by a suitable switch 58, best shown in FIGURE 6, which may for example be a "micro" switch of the kind normally biased to open position. The switch is arranged and connected to control the motor so that when the switch actuator pin 59 is depressed—moved outwardly with respect to the cylinder 16, that is inwardly with respect to the switch housing— the switch will be closed to energize the motor, whereas when it is released the switch will open to de-energize the motor by the biasing means provided in the switch.

The switch 58 is rigidly secured to a mounting and clamping ring 60 clamped about the cylinder 16 so as to position the switch actuator pin 59 opposite one of the resilient buttons 56 and so that the pin is received in the cup of the button, as shown in FIGS. 6 and 7. The button is arranged so that when it is engaged by the outward extension of an arm 51 the button will be deformed to such an extent that the pin 59 will be depressed to start the motor 13, whereas when the arm 51 is withdrawn the button will restore to its normal shape and allow the switch to open. It will be apparent, therefore, that when the knob 48 is moved to FIG. 2 to partially open the passages 39 and yieldingly to lock the stopper against vertical movement the motor will be started, whereas when the knob is returned either to the fully closed position of FIG. 3 or the fully open position of FIG. 4, the motor will be stopped. Also, it will be apparent that if the motor is operating and if the stopper be ejected in response to a jam, the arm 51 will be withdrawn from the switch button 56 which operation will allow the switch 58 to open and thereby stop the grinding operation.

In the operation of the apparatus thus far described, it will be understood that the stopper may be inserted into the drain opening onto the seat 31 indiscriminately in any one of three angular positions determined by the recesses 55; that is, it makes no difference which of the arms 51 are received in which recesses 55, since any one of the arms will actuate the switch 58. When the stopper is in position, the knob 48 may be moved between positions of FIGS. 3 and 4 to close and open the sink drain without in any way affecting the grinding operation. When it is desired to grind, the stopper is removed and the garbage inserted into the housing 4 by way of the drain sleeve 15. Then the stopper will be inserted through the drain sleeve and onto the seat 31 of the cylinder 16 and the knob 48 turned to the partially open position of FIG. 2. This will yieldingly lock the stopper in place and start the motor 13 to grind. During this operation water will be supplied from the sink into the housing 4 through the partially open stopper. During normal grinding the stopper will prevent the admission of the hand or fingers into the grinding mechanism and will prevent splashing out from the grinding mechanism into the kitchen. In the event of a jam bearing against the stopper, the stopper will be popped out to stop the grinding operation and at the same time relieve the jam.

Preferably and as shown, the bottom plate 52a will present an uninterrupted plane surface to the housing 4 which will help to obviate the formation of jams in the first place in that protuberances against which a bone could anchor itself are eliminated.

In addition to all of this aforedescribed functions of the stopper construction it is arranged to minimize air borne noises created incident to grinding. For this purpose, the bottom plate 52a substantially closes the bottom areas of the passages 39 as shown in FIG. 8 so that direct discharge at the bottom areas is prevented. Discharge takes place laterally through openings 61 formed by notching or recessing the cylindrical wall 33 as shown in FIG. 5, and the plate 52a in bottom plan (FIG. 8) is provided with three cutaway side edges 62 off-set inwardly somewhat from the outer cylindrical wall 36 at the notched sections thereof. Thus, the water draining down is forced to flow radially outward to three openings because the top of the plate 52a obstructs the through passage. Because of this arrangement, the water discharged from the sink descends in the stopper in the form of a water curtain adjacent the three inner curved sections of cylindrical wall 36 opposite the notches. Stating it differently, the water near the outer edges of the three discharge openings flows straight down forming a vertical curtain to the water flowing radially outward over the bottom plate 52a. This curtain of flowing water is an acoutical baffle or curtain against air borne noise between the comminuting chamber 5 and the sink and hence the kitchen. I have found that the formation of this curtain is enhanced by the partially open (FIG. 2) position of the valve plate 40.

While in accordance with the patent statutes I have described what at present is considered to be the preferred embodiment of my invention, it will be obvious to those skilled in the art that various changes and modifications may be made therein without departing from the invention, and it is, therefore, aimed in the appended claims to cover all such changes and modifications as fall within the true spirit and scope of the invention.

What I claim as new and desire to secure by Letters Patent of the United States is:

1. A waste disposal apparatus for use with a sink and the like structure adapted to have water supplied thereto and having a drain opening comprising, a housing enclosing a comminuting chamber having an inlet opening for connection with said drain opening for the ingress of waste material and water from the sink, power operated comminuting means in said chamber, closure means for said inlet opening having a fixed seat member which has a passage therethrough, a closure member removably seatable on said seat member having passage means therethrough for the flow of water from the sink opening into said housing, a closure plate on said closure member movable relative to said closure member to a sealing position to close said passage means to seal said inlet opening and to another position to open said passage means to permit water to flow into said housing for the comminution operation, locking means yieldingly to hold said closure member on said seat member and operably connected to said plate so that the locking means effects its yielding locking function when said plate is moved to said position to open said passage means and is rendered ineffective so as to unlock said closure member when said plate is moved to said sealing position, control means for said power operated comminuting means for rendering said comminuting means operative and inoperative, and means operably connecting said control means with said locking means to effect the operation of said comminuting means when said plate is moved to said open position and to stop said comminuting means when said plate is moved to said sealing position.

2. The waste disposal apparatus specified in claim 1 wherein said locking means includes a cup-shaped resilient member mounted in said seat member so as to have its closed end innermost and exposed in said passage and its open end outermost and exposed exteriorly of said seat member, and said locking means also including a lock arm mounted in said closure member for movement from a retracted position to an extended position wherein it engages said closed end of the resilient member to press it outwardly and thereby yieldingly hold said closure member on said seat member, said lock arm operably connected with said plate so as to be retracted when said plate is moved to its said sealing position and is extended when said plate is moved to the other position to open said passage, and said control means including an operating element received in said resilient cup so as to be moved to actuate said control means to operate the comminuting means by the deformation of said cup by its lock arm when it is extended.

3. A waste disposal apparatus as recited in claim 1 with the addition of plate means covering the central portion of the bottom of the closure member and obstructing a portion of the passage means therethrough, said passage means being formed to direct the water supplied from said sink downwardly therethrough and then radially outward and finally downward again in a vertical water curtain along the periphery of the plate means, said water curtain functioning as an acoustical baffle against airborne noise from said housing to the sink.

4. A waste disposal apparatus for use with a sink and like structure adapted to have water supplied thereto and having a drain opening comprising, a housing enclosing a comminuting chamber having an inlet opening at the top for communication with said drain opening for the ingress of waste material and water from the sink, comminuting means in said chamber including a rotary material-impelling member, power means for driving said impelling member, closure means for said inlet opening having a fixed seat member around said opening, a closure member removably seatable on said seat member having passage means therethrough for the flow of water from said sink opening into said housing, a closure plate on said closure member movable relative to said closure member to a position to close said passage means to seal said opening and thus said sink and to another position to open said passage means to permit water to flow into said housing from said sink for the comminuting operation, locking means yieldingly to hold said closure member on said seat member providing for the release and ejection of said closure member from said seat member upon the occurrence of a predetermined force operative from the direction of said comminuating chamber, and said locking means operably connected to said plate so that the locking means effects its yielding locking function when said plate is moved to said position to open said passage means and is rendered ineffective so as to unlock said closure member when said plate is moved to said sealing position, control means for said power means for rendering said power means operative and inoperative, and means operably connecting said control means with said locking means to render said power means effective to operate said impelling member when said plate is moved to said open position and to stop said impelling means when said plate is moved to said sealing position.

5. The waste disposal apparatus specified in claim 4 wherein said locking means cooperates with a resilient button mounted on said seat member, said locking means having a lock arm movably mounted on said closure member movable from a retracted position with respect to said button to a locking position wherein it abuts against said button thereby yielding to lock said closure member to said seat member, and an operable connection between said plate and lock arm to move the arm to said retracted position when said plate is moved out of its open position and to move said arm to said locking position when said plate is moved to said open position.

6. The waste disposal apparatus specified in claim 4 wherein said locking means cooperates with a series of equally spaced resilient buttons mounted on said seat member so that each has a portion received in a recess provided for it on the inner surface of said seat member and is exposed to said inlet opening through said recess, said locking means comprising a corresponding series of lock arms on said closure member radially movable from retracted positions to extended positions with respect to said closure member and when retracted having their outer ends positioned to be received in said recesses to position and guide said closure member into its seating position on said seat member, and said arms when extended protruding into said resilient buttons to deform them and thereby yieldingly hold said closure member to said seat member, and said control means having a control element positioned to be moved from one position to another position by one of said buttons when the button is deformed by its lock arm, and when moved to said other position effecting the operation of said power means to operate said impelling member.

7. A waste disposal apparatus for use with a sink and like structure adapted to have water supplied thereto and having a drain opening comprising, a tubular sleeve to depend from said drain opening, a tubular housing enclosing a comminuting chamber having an inlet opening at the top for the ingress of waste waterial and water, closure means for sealing said drain opening and for said inlet opening including a circular seat member fixed between the lower end of said sleeve and the upper end of said housing so as to connect them together, said seat member having a circular seat on its upper end exposed to said sleeve, and the closure means also including a stopper receivable on said seat member and having a circular sealing surface seatable on said seat, and having a cylindrical portion extending down into and spaced from the inner surface of said seat member and also having a passage therethrough from the top to the bottom, a plurality of radially positioned lock arms on said cylindrical portion having outer ends protruding from said portion while in retracted positions and movable therefrom to still greater extended positions, said seat member having internal vertical slots for receiving said protruding ends to hold said stopper from rotating in said seat member, a control knob on said stopper, cam means connecting said knob with said lock arms to extend said arms when the knob is moved from one position to another and to retract them when returned to said one position, resilient buttons mounted on said seat member in positions yieldingly to engage said lock arm protruding ends when the arms are extended so as to yieldingly and releasably hold said stopper onto said seat member, a closure plate for said passage mounted on said stopper having connecting means with said knob so that when said knob is moved to extend said lock arms said closure plate is moved to open said passage and when said knob is moved to retract said arms said plate moves to close said passage, and a power driven comminuting means within said housing.

8. The waste disposal apparatus specified in claim 7 wherein said comminuting means includes a rotary waste-material impelling flywheel in said chamber and an electric motor for driving said flywheel, a switch for controlling said motor and having an actuating element, means mounting said switch on the exterior of said seat member with said actuating element opposite one of said buttons and that button extending to the exterior of said seat to engage said actuating element and hence said swich to operate said motor when said button is deformed under the influence of its extended lock arm.

9. A waste disposal apparatus for use with a sink and like structure adapted to have water supplied thereto and having a drain opening comprising, a tubular sleeve to depend from said drain opening, a tubular housing enclosing a comminuting chamber having an inlet opening at the top for the ingress of waste material and water, closure means for sealing said drain opening and for said inlet opening including a circular seat member fixed between the lower end of said sleeve and the upper end of said housing so as to connect them together, said seat member having a circular seat on its upper end exposed to said sleeve, and the closure means also including a stopper receivable on said seat member and having a circular sealing surface seatable on said seat, and having a cylindrical portion extending down into and spaced from the inner surface of said seat member and also having a passage therethrough from the top to the bottom, a closure plate on said stopper for said passage, a knob on said stopper for moving said plate from a first position wherein said passage is open to a second position to seal said passage and to a third position to open said passage, a plurality of radially positioned lock arms on said cylindrical portion having outer ends protruding from said portion while in retracted positions and movable therefrom to still greater extended positions, said seat member having internal vertical slots for receiving said protruding ends to hold said stopper from rotating in said seat member, a control knob on said stopper, cam means connecting said knob with said locks arms to hold said arms in their retracted positions when said knob is moved between said first and second positions and to extend said arms when said knob is moved from said second to said third position and to retract them when returned from said third to either of said second or first positions, resilient buttons mounted on said seat member in position yieldingly to engage said lock arm protruding ends when the arms are extended yieldingly and releasably to hold said stopper onto said seat member, power driven comminuting means within said housing, and a control element for said power means positioned to be engaged and operated from one to another position by one of said buttons to start said power driven comminuting means when said button yields under the influence of its lock arm when extended, and means returning said control element to said one position to stop said power means when said button is retracted by the withdrawal of its lock arm.

10. A waste disposal apparatus for use with a sink and like structure adapted to have water supplied thereto and having a drain opening comprising, a housing enclosing a comminuting chamber having an inlet opening at the top for connection with said drain opening for the ingress of waste material and water from the sink, comminuting means in said chamber including a rotary material-impelling member, power means for driving said impelling member, closure means for said inlet opening having a fixed seat member in said opening, a stopper removably insertable in said opening having a seating surface seatable on said seat member and also having passage means therethrough for the flow of water from said sink opening into said housing, said stopper being loosely received in said opening in the sense that it may readily be removed upwardly therefrom by the application of a force applied to its bottom surface as by a bone and like object forced upwardly by said impelling member a closure plate on said closure member movable relative to said closure member to a sealing position to close said passage means to seal said opening and to another position to open said passage means to permit water to flow into said housing for the comminution operation, locking means yieldingly to hold said closure member on said seat member and operably connected to said plate so that the locking means effects its yielding locking function when said plate is moved to said position to open said passage means and is rendered ineffective so as to unlock said closure member when said plate is moved to said sealing position, control means for said power means for rendering said power means operative and inoperative, means operably connecting said control means with said locking means to render said power means effective to operate said impelling member when said plate is moved to said open position and to stop said impelling means when said plate is moved to said sealing position, the locking means being rendered effective when said stopper is inserted in said opening for interlocking said stopper with said housing to prevent relative rotary motion between them.

11. The waste disposal apparatus specified in claim 9 wherein said bottom surface defines a substantially unobstructed plane positioned transversely of said housing when the stopper is positioned on said seat.

References Cited in the file of this patent
UNITED STATES PATENTS

| | | |
|---|---|---|
| 2,509,242 | Miller et al. | May 30, 1950 |
| 2,619,654 | Coss | Dec. 2, 1952 |
| 2,724,560 | Tull | Nov. 22, 1955 |
| 2,896,866 | Hyde | July 28, 1959 |

FOREIGN PATENTS

| | | |
|---|---|---|
| 493,407 | Italy | Apr. 26, 1964 |